Oct. 28, 1969     C. M. SIDRAN     3,475,606
METHOD OF DOSIMETRY DOSE AND TIME-LAPSE READ-OUT
Filed Dec. 13, 1966
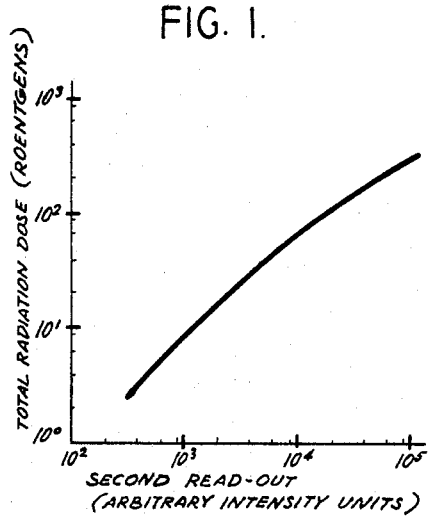
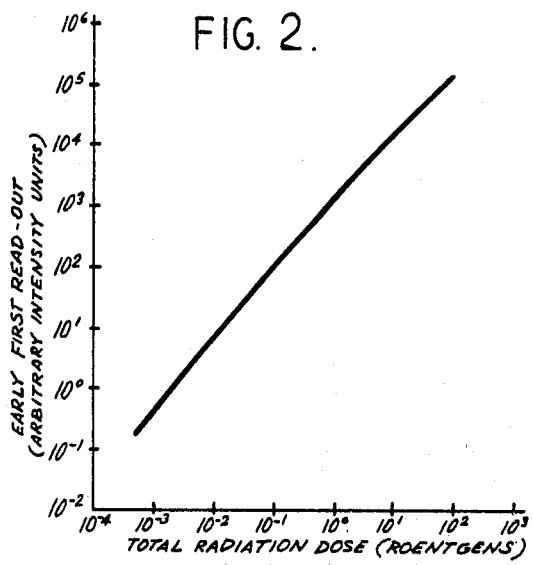
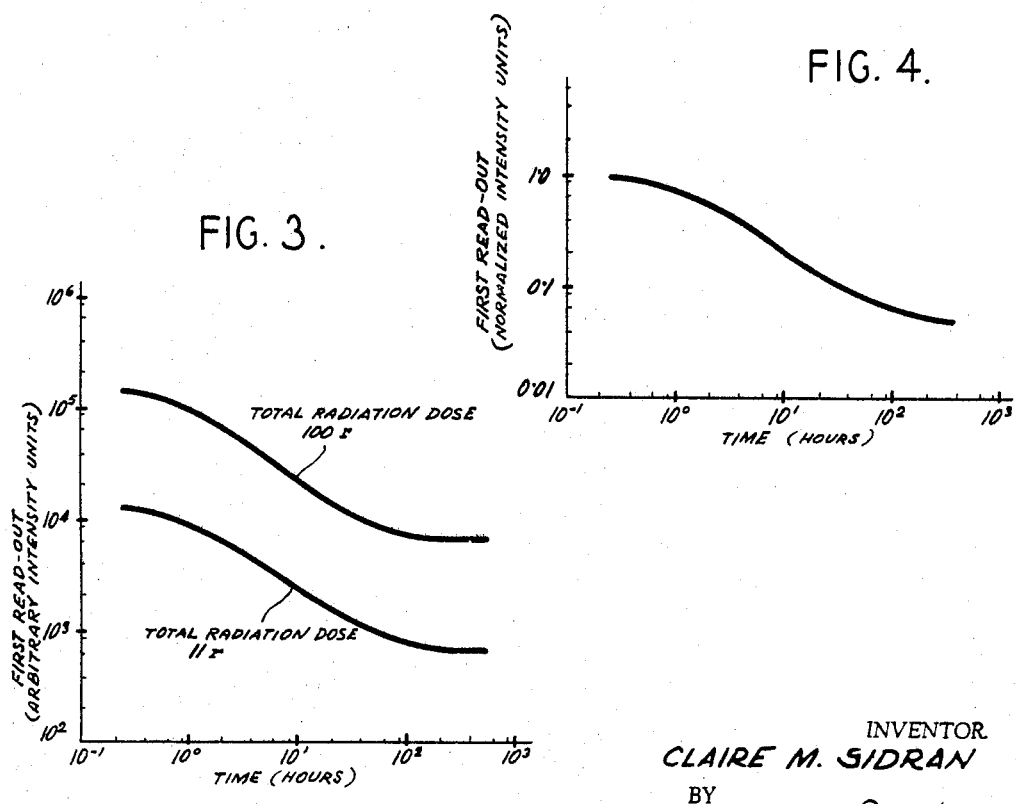
INVENTOR.
CLAIRE M. SIDRAN
BY Amster & Rothstein
ATTORNEYS

United States Patent Office 3,475,606
Patented Oct. 28, 1969

3,475,606
**METHOD OF DOSIMETRY DOSE AND
TIME-LAPSE READ-OUT**
Claire M. Sidran, 210,W. 19th St.,
New York, N.Y. 10011
Filed Dec. 13, 1966, Ser. No. 601,393
Int. Cl. H01j *39/00, 1/62;* G01n *23/00*
U.S. Cl. 250—83                                                     9 Claims

ABSTRACT OF THE DISCLOSURE

A method of dosimetry dose and time-lapse read-out. The deep trap read-out provides an indication of the radiation dose as in the prior art. Unlike the prior art in which the shallow trap read-out is not used, in the invention it is used together with the deep trap read-out to determine the time lapse since the radiation exposure. The initial shallow trap population at the time of exposure can be determined from the deep trap read-out. The ratio of the shallow trap read-out to the initial shallow trap population is then used to determine the lapse of time in accordance with the characteristics of the dosimeter.

---

This invention relates to methods of radiation dosimeter read-out, and more particularly to a method for determining both the dose to which the dosimeter was exposed and the time elapsed subsequent to the exposure.

A radiation dosimeter is a device which undergoes a physical or chemical change with exposure to radiation, the change being dependent on the radiation intensity and being characterized by the storage of energy.

Radiation dosimeters in general are used to measure either electromagnetic radiation (e.g., gamma rays, X-rays, ultraviolet and visible light) or particle radiation (e.g., protons, neutrons, electrons, alpha particles and ions).

An indication of the magnitude of the stored energy may be read out with the application of electric or magnetic fields, mechanical stress, electromagnetic radiation, heat and other forms of energy. In many cases the dosimeter is returned to the unexposed state and the stored energy released during the process is used to control the operation of a read-out indicating device. The materials which are used in the construction of dosimeters depend on the particular type of radiation to be measured as well as the method to be used subsequently to read out the magnitude of the stored energy. Typical materials which can be used include dielectrics and semiconductors (either vitreous or crystalline), and materials which exhibit properties of photoconductivity, photoluminescence, thermoconductivity, photovoltaic effects, photodielectric effects, persistent internal polarization, stimulated conductivity and stimulated luminescence. Satisfactory thermoluminescent materials are calcite, dolomite, magnesite, aragonite, and anhydrite, as described in an article entitled "Emission Centers in Thermoluminescent Calcite, Dolomite, Magnesite, Aragonite, and Anhydrite" by W. L. Medlin, published in the Journal of the Optical Society of America, vol. 53, No. 11, pp. 1276–1285, November 1963. Other materials which can be used are lithium fluoride and calcium fluoride.

In many cases the material used exhibits a series of energy "trap" levels between the valence and conduction bands. Upon exposure, the incident radiation causes electrons or positive holes to make transitions to the intermediate energy levels. During the read-out process the trapped electrons or holes are released thereby producing a measurable optical, electrical, etc. phenomenon dependent upon the dose of radiation to which the dosimeter had been exposed.

Generally the electrons are trapped at metastable levels, levels from which downward transitions to the valence band are forbidden. In the absence of the application of stimulating energy the electrons are unable to jump up to the conduction band and remain at the trapped levels. With the application of the stimulating energy, the trapped electrons jump up to the conduction band to provide the necessary read-out. The deeper the trap levels the more stimulating energy is required for read-out. Conversely, the shallower the traps the less energy required to empty the traps. In the past, materials have been sought which exhibit traps only at deep levels. If some of the traps of a dosimeter material are at shallow levels it is possible that some of the stored energy will be released by transitions from the trap level to the conduction band with the absorption of thermal energy alone, that is, the energy available at ordinary room temperatures. (For materials with positive hole traps the operations are analogous, but the transitions are the inverses of those described above. While the description below is directed to materials with electron traps, the principles of the invention are equally applicable to materials exhibiting hole traps.)

If a deep and shallow trap material is used, some of the incident radiation results in the storage of electrons in both the shallow and deep traps. Those in the shallow traps decay with time, usually exponentially, due to the absorption of thermal energy. The read-out is thus a function of the total number of electrons trapped in the deep levels as well as the number remaining in the shallow levels. As a result the read-out indication is a function of time as well as exposure dose. The shallow trap phenomenon has led the industry to seek materials which exhibit only deep traps.

The search for an ideal material has not been fruitful. The materials in present day use exhibit shallow traps as well as deep traps. The read-out is thus time dependent, causing a loss of accuracy in dose read-out. To overcome the time-dependent problem, the read-out is sometimes performed in two steps. First, weak stimulating energy in the form of low-energy light, a weak electric field, etc. is applied to the dosimeter to release all of the remaining electrons or holes in the shallow traps. The meter reading is usually not even taken, and if it is it is not used. Following the clearing of the shallow traps, higher stimulating energy is applied to clear the deep traps. The read-out indication taken at this time is a measure of the exposure dose. This technique is generally satisfactory to eliminate the time dependence of the dose indication because for any given radiation dose the trapped electrons or holes generally divide between the deep and shallow energy levels in a fixed proportion. For example, suppose that for a given radiation dose 75% of the trapped electrons or holes remain at the deep levels. While the other 25% in the shallow traps decay with time, if these traps are completely cleared before the high energy read-out step is performed, the measured read-out is a function only of the 75% of the electrons or holes trapped in the deep levels. The read-out is thus dependent on the initial incident radiation dose, and with appropriate calibration of the indicating equipment the total incident radiation dose may be determined. This prior art read-out technique provides only one type of information—the magnitude of the radiation dose to which the dosimeter has been exposed.

But in many situations it is important to determine not only the magnitude of the dose, but in addition the time at which the exposure occurred. For example, a dosimeter might be carried by a space satellite to determine the intensity and position of a radiation belt. When the dosimeter is retrieved the intensity of the radiation belt may be easily determined. But to determine the position of the radiation belt, it is necessary to determine the time at which the exposure took place. If the course of the satellite is known as a function of time, by determining the time of the exposure the radiation belt in space can be plotted. Another example in which the knowledge of the exposure time can be used to advantage is the treatment of persons accidentally exposed to high radiation doses. The particular treatment which is most suitable in many cases depends upon not only the radiation dose, but in addition on the time which has elapsed between exposure and treatment. Furthermore, a knowledge of the time of the accidental exposure makes it easier to trace the cause of the accident.

It is a general object of this invention to provide a method for read-out of conventional radiation dosimeters to derive indications of both dose magnitude and the time elapsed subsequent to exposure.

In accordance with the principles of my invention the aforesaid low-energy read-out step (often referred to as "pre-stimulation") is used to advantage. The read-out mechanism functions in the ordinary manner to provide a measurable output. As in conventional practice, the second read-out is also recorded. This second read-out is used by itself, as in the prior art, to determine the magnitude of the dose. The second read-out is then used together with the first to determine the time which has elapsed subsequent to exposure.

The method of my invention is predicated on the following observations. For any particular dosimeter material and for any radiation dose, the ratio of the number of electrons or holes trapped in deep levels to the number initially trapped in shallow levels can generally be determined. For any material the decay characteristic of the shallow traps can also be ascertained. The second read-out provides an indication of the initial dose. Since the ratio of the filled deep traps to the initially filled shallow trap is known for this dose, the initial number of filled shallow traps may be determined. The first read-out provides an indication of the number of shallow traps still filled at the time of read-out. Consequently, since the ratio of the final shallow trap population to the initial shallow trap population may be computed, the decay characteristic may be used to determine how much time must elapse before the initial shallow trap population decays to the final shallow trap population. This time is that which has elapsed between the initial exposure and the read-out.

It is a feature of my invention to utilize the first dosimeter read-out, together with the conventional second dosimeter read-out, to determine the time elapsed between the radiation exposure and the read-out.

Further objects, features and advantages of my invention will become apparent upon consideration of the following detailed description, in conjunction with the drawing in which:

FIG. 1 is a plot of the total radiation dose as a function of the second read-out (in arbitrary intensity units) for a particular radiation dosimeter and associated read-out device;

FIG. 2 is a plot of the early (immediately after exposure) first read-out (in arbitrary intensity units) as a function of the total radiation dose for the same dosimeter and read-out device;

FIG. 3 is a plot of the first read-out (in arbitrary intensity units) as a function of time after exposure for two different total radiation doses for the same dosimeter and read-out device; and FIG. 4 depicts a normalized plot of the curves of FIG. 3.

The four curves shown in the drawing apply to a specific radiation dosimeter and the read-out mechanism with which it is used. The dosimeter and read-out mechanism may be of the types in present day use. Although not all of the curves (or equivalent tabulated data) depicted in the drawing are generally provided with conventional units, for the most convenient practice of my invention the curves should be prepared by the manufacturer or the user. As will be described below, especially in the case of constant-slope functions some of the curves may not be necessary.

A calibration curve (or equivalent data) similar to that of FIG. 1 is generally provided with present-day dosimeter and associated read-out devices. When the dosimeter is placed in the read-out device the shallow traps are first cleared with the application of low-energy stimulating light, voltage, heat, etc. Although a first read-out may be taken it is not used in conventional practice. Thereafter, the high-energy stimulating light, voltage, etc. is applied for the purpose of clearing the deep traps. The second read-out taken at this time is an indication of the total radiation dose to which the dosimeter was exposed.

For any given radiation dose some of the absorbed radiation results in the filling of shallow traps while some results in the filling of deep traps. Consequently, the number of electrons in the deep traps is dependent on the total radiation dose. The second read-out which is dependent upon the number of filled deep traps thus provides an indication of the total radiation dose.

The second read-out data is shown in "arbitrary intensity units" on a log-log scale. A meter on the read-out device may be read., and using the meter read-out value in conjunction with the graph of FIG. 1 the total radiation dose may be determined. It will be noted that the curve of FIG. 1 is not a straight line. If the function is linear, there may be no need for a graph similar to that of FIG. 1. The read-out in arbitrary intensity units may be multiplied by a constant factor to determine the total radiation dose.

The function of FIG. 1 is curved slightly because with most dosimeter materials the number of filled deep traps is not exactly proportional to the radiation dose. For this reason the conversion factor between the second read-out and the total radiation dose is not fixed and the curve of FIG. 1 can be used to great advantage in finding the total dose from the second read-out.

As in conventional practice, the second read-out, with the use of the graph of FIG. 1, provides an indication of the total radiation dose. Once the total radiation dose is known, the graph of FIG. 2 may be used to determine the "early" first read-out. As described above, the magnitude of the first read-out varies with time because the number of shallow traps filled with electrons or holes decays as a result of thermal energy. The actual first read-out detected in practice is a measure of the number of shallow traps filled at the time of the reading. But for the practice of my invention it is necessary to determine the relative number of shallow traps filled at the time of exposure to the radiation. The graph of FIG. 2, provides this information.

Recalling that for any given dose of radiation the initial ratio of the number of filled deep traps to the number of filled shallow traps is predetermined, it is apparent that the relative number of shallow traps initially filled may be determined from the total radiation dose. Once the total radiation dose has been determined from the graph of FIG. 1, the graph of FIG. 2 may be used to determine what the first read-out would have been had it been taken earlier, i.e., immediately after exposure to the radiation.

It should be noted that the plot of FIG. 2 is also curved, the slope decreasing with increasing radiation. As described above with reference to FIG. 1, with the dosimeter under consideration the number of initially filled shallow traps is not exactly proportional to the total radiation dose. This necessarily implies that with increasing radiation, while more and more shallow traps are filled the rate of increase tapers off. This decreasing rate is evidenced in FIG. 2 by the decreasing slope of the curve. (To determine the initial values necessary to prepare the various graphs of FIGS. 1 and 2, it is only necessary to expose the dosimeter to various radiation doses and to immediately take first and second read-outs.)

FIG. 3 depicts, for two different radiation exposure doses, the magnitude of the first read-out as a function of time. Although only two curves are shown, for doses of 11 r. and 100 r., in general the curves for all radiation doses have the same shape. The number of filled shallow traps generally decays exponentially with time. The initial magnitudes of the two curves in FIG. 3 can be verified by comparison with the curve of FIG. 2. For example, for a total radiation dose of 100 r., the early first read-out, in arbitrary intensity units, is approximately $10^5$ as shown in FIG. 2. Reference to FIG. 3 shows that for the same total radiation dose of 100 r., the first read-out at small values of time, i.e., immediately after exposure, is also approximately $10^5$. Similar remarks apply to the early first read-out for a total radiation dose of 11 r. (slightly in excess of $10^4$ in both FIGS. 2 and 3).

The curve of FIG. 4 has the same shape as all those which might be included in FIG. 3. But the vertical axis is normalized. The curve of FIG. 4 represents the percentage decay from an arbitrary initial value of unity as a function of time.

If a curve is provided in FIG. 3 for the particular total radiation dose determined from FIG. 1, it is not necessary to use FIGS. 2 and 4 to determine the elapsed time. For example, if from the second read-out it is determined from FIG. 1 that the total radiation dose was 100 r., the graph of FIG. 3 may be used directly to determine the time elapsed since exposure. Using the value of the actual first read-out as the y-axis coordinate, the associated x-axis coordinate along the 100 r. curve represents the elapsed time subsequent to exposure.

But if the only curves to be used are those of FIGS. 1 and 3, it is necessary to provide an individual curve in FIG. 3 for each possible radiation dose. Rather than to prepare such a complete set of curves, it is possible to resort to the curves of FIGS. 2 and 4 instead of those of FIG. 3.

To use the curve of FIG. 4 it is necessary to form the ratio of the actual first read-out to the early first read-out computed from FIG. 2. With this ratio as the value of the y-axis coordinate, the x-axis (time) coordinate is determined from the curve of FIG. 4. This value is again the time elapsed since exposure.

If the curves of FIGS. 2 and 4 are used rather than those of FIG. 3, two additional steps are required. First, it is necessary to determine the early first read-out value from FIG. 2. Second, it is necessary to form the ratio of the actual first read-out to the early first read-out before determining the time from FIG. 4. On the other hand, if FIG. 3 is used, i.e., there is provided a curve for the particular total radiation dose, it is not necessary to compute the early first read-out nor is it necessary to form the ratio. The actual first read-out value is used together with the appropriate curve to determine the time directly.

It is apparent that in accordance with the principles of my invention a conventional dosimeter and associated read-out mechanism may be used to provide not only an indication of the total radiation dose but also an indication of the time elapsed subsequent to exposure. The total radiation dose is determined, as in the prior art, in effect by measuring the number of deep traps filled with electrons or holes. The time elapsed since exposure is determined in effect by measuring not only the number of deep traps filled with electrons or holes, but in addition by measuring the number of shallow traps still filled and using the two values together.

If two radiation doses are received at different times by the dosimeter, then according to the practice of my invention, the second read-out still indicates the sum of the radiation doses received, while the first read-out enables a weighted average of the times since exposures to be determined. If the two doses are equal, the second read-out indicates a time value weighted toward that of the more recently received dose. If it is desired to determine both time indications accurately it is possible to use a dosimeter material having two sets of shallow traps, each capable of giving time read-out for a different period. For instance, one shallow trap level might give time indications up to one week, and another might give time indications up to one month, with the deep traps still giving the dose indication.

The principles of my invention can also be applied to dosimeters exhibiting non-destructive read-out of stored energy and/or dosimeters whose operations are not dependent on trap levels. For example, the initial reading of an electroscope, recorded at the time of exposure by some suitable device, would give the total dose. The final reading would indicate the time elapsed since exposure, provided the rate of decay of dose indication by leakage of electrostatic charge through air is known.

Although the invention has been described with a certain degree of particularly, it is to be understood that the method described is merely illustrative of the application of the principles of the invention. Numerous modifications may be made therein and other arrangements may be devised without departing from the spirit and scope of the invention.

What is claimed is:

1. A method of reading out and determining information represented in a radiation dosimeter comprising the steps of:
    (1) performing a low-energy read-out to derive an indication of the number of filled shallow traps in the dosimeter,
    (2) performing a high-energy read-out to derive an indication of the number of filled deep traps in the dosimeter,
    (3) deriving directly from the high-energy read-out indication the associated value of radiation dose to which the dosimeter was exposed, and
    (4) utilizing said low-energy read-out indication and said high-energy read-out indication together to determine the time elapsed subsequent to the exposure of said dosimeter to radiation.

2. A method of reading out and determining information represented in a radiation dosimeter in accordance with claim 1 wherein step (4) includes the sub-steps of:
    4(a) determining from the value of radiation does derived in step (3) the low-energy read-out indication which would have been obtained had the low-energy read-out occurred immediately subsequent to exposure,
    4(b) forming the ratio of the low energy read-out indication derived in step (1) to that determined in step 4(a), and
    4(c) using said ratio formed in step 4(b) in conjunction with normalized shallow trap time decay data for said dosimeter to determine said elapsed time.

3. A method of reading out and determining information represented in a radiation dosimeter in accordance with claim 1 wherein in step (4) the elapsed time is determined from the low-energy read-out indication derived in step (1) and data for said dosimeter characterizing the low-energy read-out as a function of time for the value of radiation dose determined in step (3).

4. A method of reading out and determining information represented in a radiation dosimeter, said dosimeter having a first property characteristic dependent upon the total radiation dose to which the dosimeter was exposed and a second property characteristic dependent upon both the total radiation dose to which the dosimeter was exposed and the time elapsed subsequent to exposure, comprising the steps of:
    (1) performing a first read-out of said dosimeter to obtain a first value dependent upon said first property, (2) performing a second read-out of said dosimeter to obtain a second value dependent upon said second property, (3) deriving from said first value obtained in step (1) an indication of the total radiation dose to which said dosimeter was exposed, and (4) deriving from said first and second values obtained respectively in steps (1) and (2) an indication of the time elapsed subsequent to the exposure of said dosimeter to radiation.

5. A method of reading out and determining information represented in a radiation dosimeter in accordance with claim 4 wherein step (4) includes the sub-steps of:

4(a) determining from the indication of total radiation dose derived in step (3) the value of the read-out dependent upon said second property which would have been obtained had said second property read-out occurred immediately subsequent to exposure, 4(b) forming the ratio of the value obtained in step (2) to that determined in step 4(a), and 4(c) using said ratio formed in step 4(b) in conjunction with data for said dosimeter characterizing second property read-out values as a function of time to determine said elapsed time.

6. A method of reading out and determining information represented in a radiation dosimeter in accordance with claim 4 wherein in step (4) the elapsed time is determined from the first property read-out value obtained in step (1) and data for said dosimeter characterizing second property read-out values as a function of time for the value of total radiation dose derived in step (3).

7. For use with a radiation dosimeter and an associated read-out device, a method for determining the radiation dose to which said dosimeter has been exposed and the time elapsed since exposure, data being available for said dosimeter and said read-out device characterizing:

(a) the total radiation dose to which said dosimeter has been exposed as a function of a high-energy read-out by said read-out device, and (b) low-energy read-outs of said read-out device as a function of time for discrete values of radiation dose exposures;

comprising steps of:

(1) performing a low-energy read-out to derive a first read-out value, (2) performing a high-energy read-out to derive a second read-out value, (3) determining from said data (a) and said second read-out value derived in step (2) the total radiation dose to which the dosimeter has been exposed, and (4) determining from said data (b), said first read-out value derived in step (1), and the total radiation dose determined in step (3) the time elapsed since exposure.

8. For use with a radiation dosimeter and an associated read-out device, a method for determining the radiation dose to which said dosimeter has been exposed and the time elapsed since exposure, data being available for said dosimeter and said read-out device characterizing:

(a) the total radiation dose to which said dosimeter has been exposed as a function of a high-energy read-out by said read-out device, (b) the low-energy read-out of said read-out device for low-energy read-outs immediately following exposure as a function of total radiation dose, and (c) the normalized low-energy read-out as a function of time;

comprising the steps of:

(1) performing a low- energy read-out to derive a first read-out value, (2) performing a high-energy read-out to derive a second read-out value, (3) determining from said data (a) and said second read-out value derived in step (2) the total radiation dose to which the dosimeter has been exposed, (4) determining from said data (b) the low-energy read-out value which would have been obtained for the value of total radiation dose determined in step (3) had the low-energy read-out been performed immediately subsequent to exposure, (5) forming the ratio of the value derived in step (1) to the value determined in step (4), and (6) determining from said data (c) the elapsed time for the ratio formed in step (5).

9. For use with a radiation dosimeter and an associated read-out device, a method for determining the radiation dose to which the dosimeter has been exposed and the time elapsed since exposure, data being available for said dosimeter and said read-out device characterizing:

(a) read-out values for a first type of read-out dependent upon the total radiation dose to which said dosimeter has been exposed, and (b) read-out values for a second type of read-out dependent upon the total radiation dose to which said dosimeter has been exposed and the time elapsed since exposure;

comprising the steps of:

(1) performing said first type of read-out to derive a first read-out value, (2) performing said second type of read-out to derive a second read-out value, (3) determining from said first read-out value derived in step (1) and said data (a) the total radiation dose to which the dosimeter has been exposed, and (4) determining from said first and second read-out values obtained respectively in steps (1) and (2), and said data (b), the time elapsed since exposure.

References Cited

Henisch, H. K., Electroluminescence, 1962, New York, pp. 104–107.

ARCHIE R. BORCHELT, Primary Examiner

SAUL ELBAUM, Assistant Examiner

U.S. Cl. X.R.

250—71